UNITED STATES PATENT OFFICE.

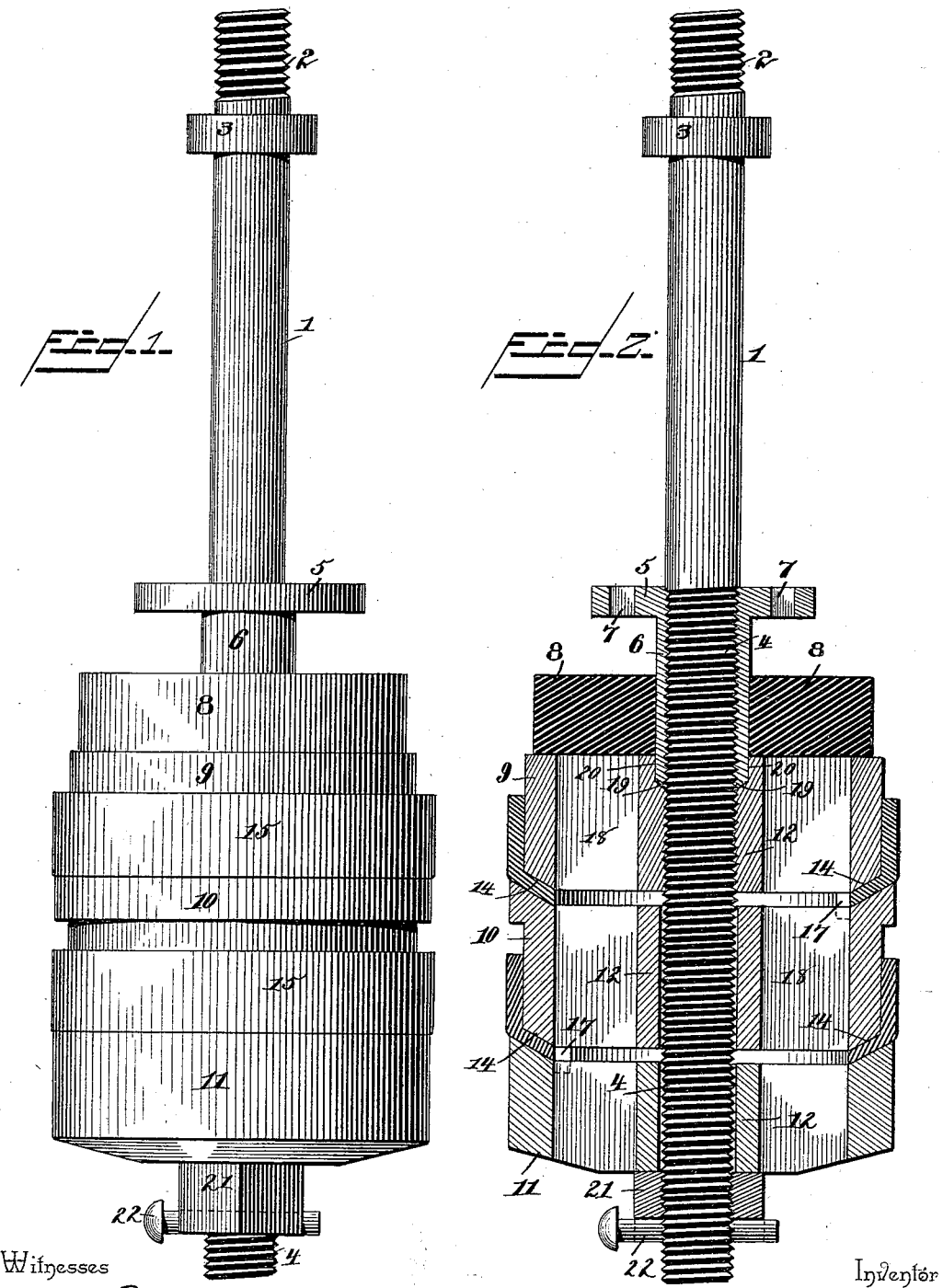

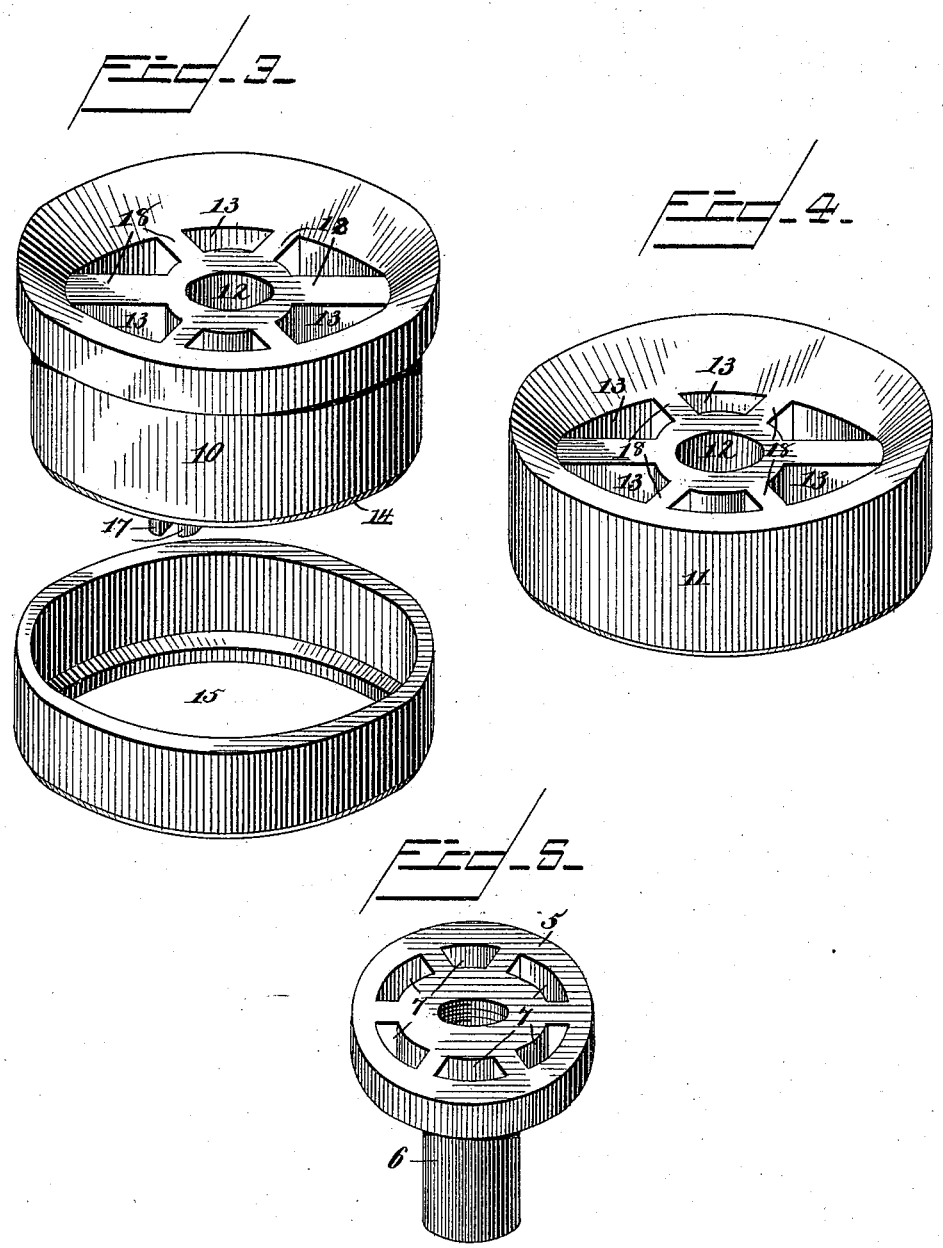

AUGUST D. COOK, OF LAWRENCEBURG, INDIANA.

PLUNGER FOR PUMPS.

SPECIFICATION forming part of Letters Patent No. 493,249, dated March 14, 1893.

Application filed January 24, 1891. Serial No. 378,951. (No model.)

*To all whom it may concern:*

Be it known that I, AUGUST D. COOK, a citizen of the United States, residing at Lawrenceburg, in the county of Dearborn and State of Indiana, have invented a new and useful Plunger for Pumps, of which the following is a specification.

This invention relates to plungers for deep well pumps and it has for its object to provide a pump plunger of this class which shall be simple, durable and inexpensive and which shall be so constructed as to render leakage practically impossible.

The invention consists in the improved construction, arrangement and combination of parts which will be hereinafter fully described and particularly pointed out in the claim.

In the drawings hereto annexed—Figure 1 is a side view of the plunger constructed in accordance with my invention. Fig. 2 is a vertical sectional view of the same. Fig. 3 is a perspective view of one of the plunger disks with the packing ring detached. Fig. 4 is a perspective view of the bottom disk. Fig. 5 is a perspective view of the collar forming the guide for the valve.

Like numerals of reference indicate like parts in all the figures.

1 designates the plunger rod which is provided at its upper end with a screw threaded portion 2 and collar 3 for connecting it in the usual manner to the upwardly extending operating rod. The lower end of the plunger rod is screw-threaded as shown at 4 and upon it is mounted a collar 6 having at its upper end a flange 5 provided with perforations 7. The collar 6 is made of suitable anti-friction metal, which shall admit of a smooth finish and it is screwed tightly upon the plunger rod to form a guide or bearing for the vertically movable valve. The latter is composed of a ring or annular disk 8 made preferably of rubber and of any suitable dimensions as to thickness, the diameter of said valve being obviously less than the interior diameter of the working barrel in which the plunger is destined to work. The plunger proper is composed of three or more disks or sections, in the drawings hereto annexed three being shown. These three sections, numbered respectively 9, 10, and 11, be it understood, are considered necessary in the construction of the pump, but the central or intermediate section 10 may be duplicated or any desired number of sections like it may be used. However, I have found it imperatively necessary, in order to make the plunger withstand the strain and to prevent its leaking, to employ not less than three sections, as before stated. Each of the disks or sections 9, 10 and 11 is composed of a circular disk having a central opening whereby it may be mounted upon the plunger rod as shown at 12 and each of said disks is further provided with openings 13 for the passage of fluid. The upper disk 9 and the intermediate disk or disks 10 are provided with annular beveled faces or recesses 14 to receive the packing rings 15 and each of the said disks is also provided with downwardly extending lugs 17 having bifurcated ends adapted to straddle one of the walls or webs 18 separating the perforations 13 in the disk next below for the purpose of keeping the said openings in the several disks in alignment with each other for the passage of fluid. The opening 12 of the upper disk 9 is screw-threaded in order that the said disk may be screwed up tightly against the lower end of the sleeve or collar 6 which latter is beveled as shown at 19 and adapted to engage a recess or annular socket 20 formed in the upper side of the said disk 9, said annular socket being also beveled at its bottom to correspond with the bevel 19 at the lower end of the sleeve 6. A nut 21 which may be additionally secured by the transverse pin 22 serves to secure the lower disks 10 and 11 upon the plunger rod. This construction having the lower beveled end of the sleeve or collar 6 clamped in the annular socket or recess of the upper disk, prevents the said collar from spreading when the disk is clamped there against, and thereby enlarging the perforation of the valve, which must in such case soon become defective. This is particularly liable to occur when a separate sleeve or collar is used between the top of the valve seat, and the stop. This invention combines these features in a single piece and fastens the same in such a manner as to avoid the disadvantages noted.

The operation of my improved plunger will be very readily understood. On the down stroke of the plunger, the fluid will enter through the openings or perforations 13 in the disks 11, 10 and 9 and pass under the valve in an upward direction above the plunger. On the upstroke the valve drops to its seat and the fluid will be raised in the ordinary manner. A check valve is of course to be employed in the well casing as is usually the case.

My improved pump plunger is especially adapted for use in deep wells where a considerable body of water has to be lifted and where the strain upon the plunger and the danger of leakage are correspondingly great. By my improved construction any desired number of packing rings may be used so that a flaw in one of them will not seriously interfere with the operation of the device. The general construction is simple and of such a nature as to admit of smooth and accurate finish. The valve especially is exceedingly simple and is not liable under any circumstances to get out of order, it being mounted upon the smoothly finished collar 5, the flange at the upper end of which limits the movement of said valve.

Having thus described my invention, what I claim is—

In a pump, the combination of the plunger rod having a continuously threaded portion, a series of plunger disks arranged on said rod and provided with a series of aligning fluid-passage walls and integral depending bifurcated lugs extended below said walls and embracing the upper edges of the walls below, the upper of said disks having a threaded opening to engage the threaded plunger rod, and an annular beveled socket or recess at the upper end of said threaded opening, packing between said disks, an integrally flanged screw sleeve embracing the plunger rod and having a beveled lower end registering inside of the socket or recess of the upper disk, and a vertically movable valve disk working on said screw sleeve between its flange and the upper disk, substantially as set forth.

In testimony that I claim the foregoing as my own I have hereto affixed my signature in presence of two witnesses.

AUGUST D. COOK.

Witnesses:
J. F. COOK,
CHARLES L. SKINNER.